United States Patent
Bang et al.

(10) Patent No.: US 7,094,012 B1
(45) Date of Patent: Aug. 22, 2006

(54) QUICK SET-UP TILT TABLE

(76) Inventors: Charles A. Bang, 5640 Shannon Valley Rd., Acton, CA (US) 93510; George Iljin, 1012 Hagen Ct., Simi Valley, CA (US) 93065

( * ) Notice: Subject to any disclaimer, the term of this patent is extended or adjusted under 35 U.S.C. 154(b) by 468 days.

(21) Appl. No.: 10/741,105

(22) Filed: Dec. 22, 2003

Related U.S. Application Data

(60) Provisional application No. 60/448,434, filed on Feb. 20, 2003.

(51) Int. Cl.
*B23Q 3/04* (2006.01)

(52) U.S. Cl. .............................. 409/221; 108/6; 269/71; 269/74; 269/309; 408/89; 409/224

(58) Field of Classification Search ................ 409/220, 409/221, 222, 224; 408/89, 90, 103; 269/53, 269/60, 71, 74, 309; 108/6, 8
See application file for complete search history.

(56) References Cited

U.S. PATENT DOCUMENTS

| | | | | | |
|---|---|---|---|---|---|
| 634,225 | A | * | 10/1899 | Wilson | ........................... 108/8 |
| 700,000 | A | * | 5/1902 | Young | ........................... 408/62 |
| 2,059,753 | A | * | 11/1936 | Scott et al. | .................. 409/223 |
| 2,075,008 | A | * | 3/1937 | Damm et al. | ................ 409/168 |
| 2,366,385 | A | * | 1/1945 | Comfort | ....................... 33/538 |
| 2,495,250 | A | * | 1/1950 | Gilly | ............................ 108/3 |
| 2,807,920 | A | * | 10/1957 | Householder | ............... 451/369 |
| 5,634,748 | A | * | 6/1997 | Brazell et al. | ................ 408/89 |

* cited by examiner

*Primary Examiner*—Daniel W. Howell
(74) *Attorney, Agent, or Firm*—Edgar W. Averill, Jr.; Kenneth L. Green

(57) ABSTRACT

A quick set-up tilt table for securement to a precision vise of a tool. The tilt table is made from a plate of metal with a pair of flat parallel sides with holes formed in an arc for insertion of pins. The tilt table may be placed in the precision vise with pins inserted in appropriately marked holes and resting against the top of the precision vise to provide an upper surface to which a clamping fixture may be attached at the desired angle.

8 Claims, 4 Drawing Sheets

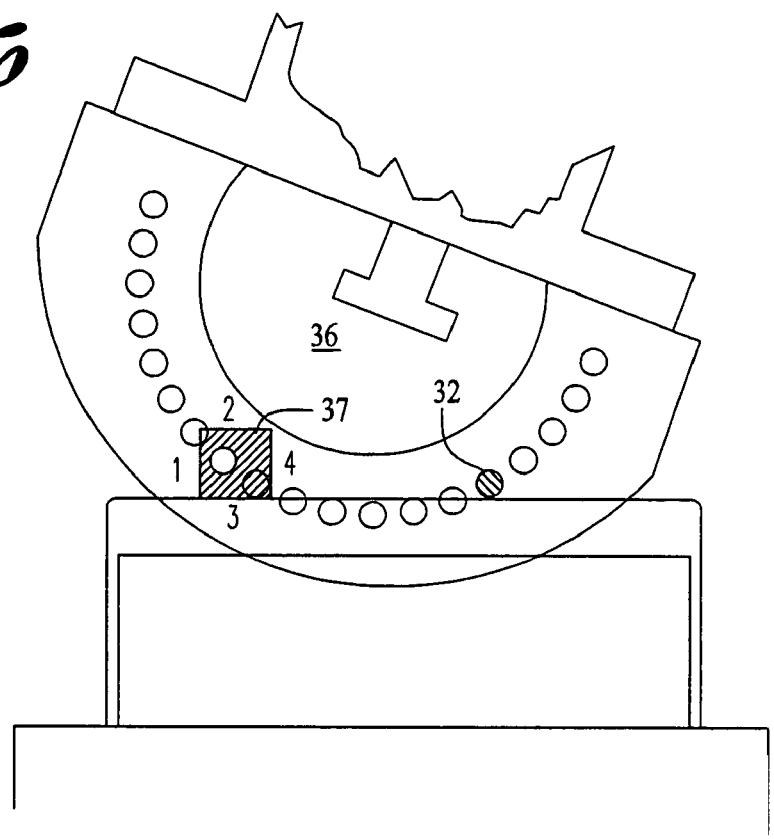
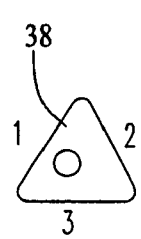
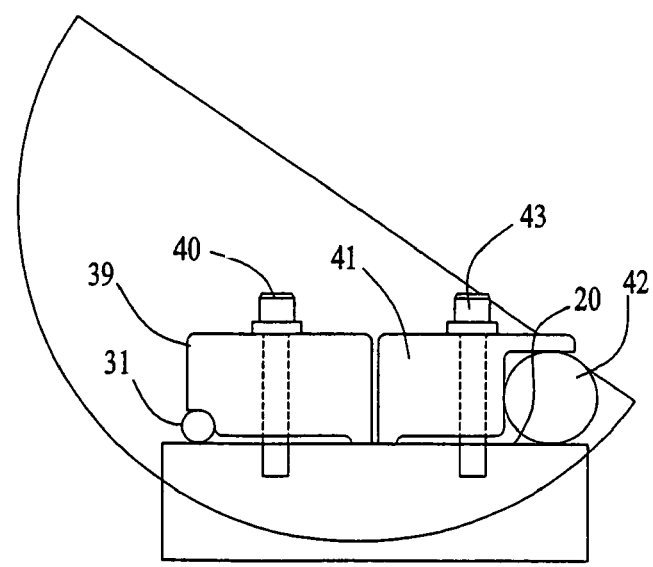
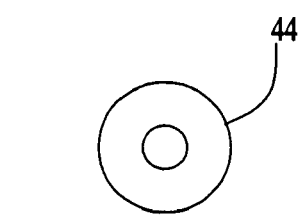

QUICK SET-UP TILT TABLE

CROSS-REFERENCE TO PRIOR APPLICATIONS

A provisional application on the subject invention was filed on Feb. 20, 2003, and assigned Ser. No. 60/448,434.

BACKGROUND OF THE INVENTION

The field of the invention is machine tools and the invention relates more particularly to devices for affixing work pieces on a tool, such as a milling machine, so that the work piece is held at a known desired angle.

Milling parts in specific angles and with accuracy on the X-Z and Y-Z planes requires the use of special fixtures, such as special fixed angle fixtures, tilting tables, and swivel angle plates, sine tables and rotary tables.

Special fixed angle fixtures are usually homemade fixtures made to set and clamp a part to be machined and the fixture is fixed to a specific angle. Such fixtures are very expensive because they have to be redone and redesigned for any other angle and/or any other part. Fixtures of this type can be very accurate (plus or minus 30 seconds), but they are not versatile and not very quick to set up.

Tilting tables and swivel angle plates are available. They are very standard and more versatile than special fixed angle fixtures because other standard fixtures, such as indexers, clamp holders, vises, and rotary tables can be mounted on top. This type of table is usually built with two pieces, one bottom plate to be clamped to the table of the machine, and the other a top plate that swivels or tilts up and down. These fixtures are not too expensive but do not provide great accuracy (with one degree at best). The angle is set visually using graduated angular scales that are part of the fixture or using external protractors. They are versatile, not too accurate and not too quick to set up.

Sine tables are similar to tilt tables, but they are stronger and very accurate. These tables are also built on two pieces like the tilting tables and swivel angle plates. In this case, both plates are hinged on one end and the angle is achieved by using gauge blocks. Some calculations in trigonometry are required to define the height of the gauge blocks. These types of fixtures are versatile, very accurate, not too quick to set up, and expensive.

Rotary tables, either manual or CNC controlled, can be mounted on machines vertically and, by using angle plates, such as indexers, clamp holders, vises, and rotary tables, can be mounted on top of the angle plate and the angles can be obtained by the rotation of the rotary table itself. In general, these types of fixtures are very versatile, very accurate, very expensive, and the set up is very time consuming.

There is, thus, a need for a tilt table which is quick to set up, accurate, flexible and versatile.

BRIEF SUMMARY OF THE INVENTION

The present invention is for a tilt table for securement to a precision vise of a tool. The precision vise has a pair of jaws which form a flat upper surface. The tilt table is a plate of metal having a top, a bottom, a front side, a back side, a right side, and a left side, having a thickness of at least ¼ inches between the front side and the back side. The bottom is in the shape of one-half of a cylinder or a polygon, and the top is flat and configured to receive other clamping fixtures. The front and back sides are perfectly flat and parallel to each other and perpendicular to the flat top. A series of a first and a second set of holes are machined in the front side and a corresponding set formed in the back side so that the holes in the front side match the holes in the back side. A plurality of indexing pins are insertable in the holes of said plate of metal so that the first set of indexing pins extends from first set of holes in said front side and a corresponding set of holes in the back side, and a second set of indexing pins extends from one of said second set of holes in said front side and corresponding holes in said back side.

Where one tilt table is inserted between the jaws of a precision vise, the indexing pins rest on the flat upper surface of the vise and the top of the tilt table is set at a desired angle with respect to the flat upper surface of the precision vise. Preferably, the holes are identified by indicia indicating specific angles. The indexing pins may be clamped to the vise to secure the tilt table so that the indexing pins are sure to touch the flat upper surface.

Gauge blocks may be provided between one of the sets of indexing pins to provide a tilt angle between that angle provided by the series of holes in the tilt table. Also, shaped extensions may be provided on one of the set of indexing pins so that the shaped set of indexing pins raises the tilt table at the shaped indexing pin so that the tilt table tilts at an angle between adjacent holes. The shaped extension may be square, triangular, circular or polygonal to vary the angle of tilt as desired.

BRIEF DESCRIPTION OF THE SEVERAL VIEWS OF THE DRAWING

FIG. 6 is a front view of the tilt table of FIG. 1 showing a square extension on one of the indexing pins.

FIG. 7 is a front view of an indexing pin enlargement with a triangular enlargement.

FIG. 8 is a side view of a tilt table showing a double indexing pin clamp.

FIG. 9 is a front view of an indexing pin enlargement with a circular enlargement.

DETAILED DESCRIPTION OF THE INVENTION

Figure 1:
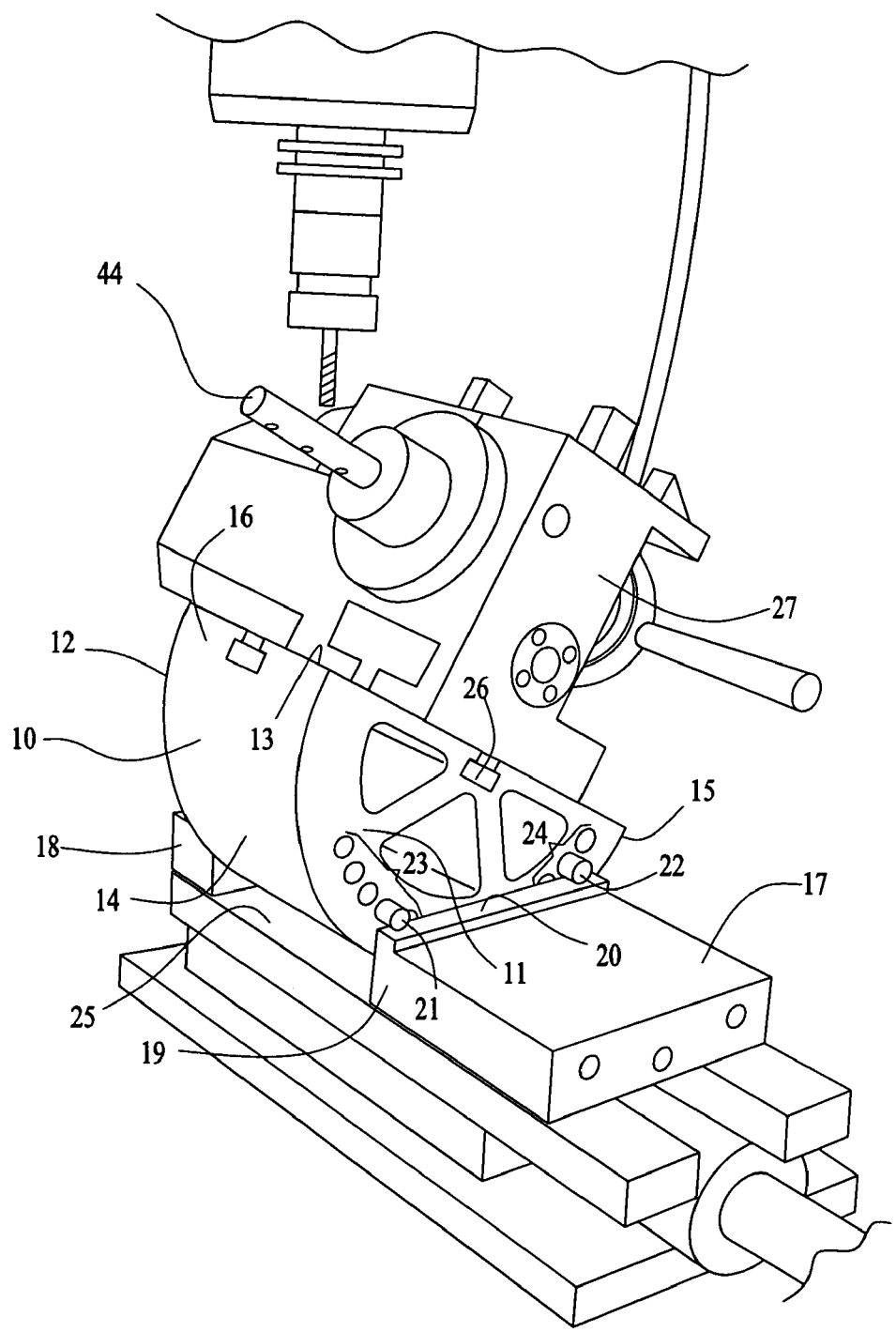
FIG. 1 is a perspective view showing the tilt table of the present invention held in a precision vise and holding a fixture.

A tilt table is shown in perspective view in FIG. 1 and indicated generally by reference character 10. Tilt table 10 has a front side 11, a back side 12, a flat top 13, a bottom 14, a right side 15, and a left side 16. The front side 11 and back side 12 are precision machined to be parallel to one another and perpendicular to flat top 13.

Figure 4:
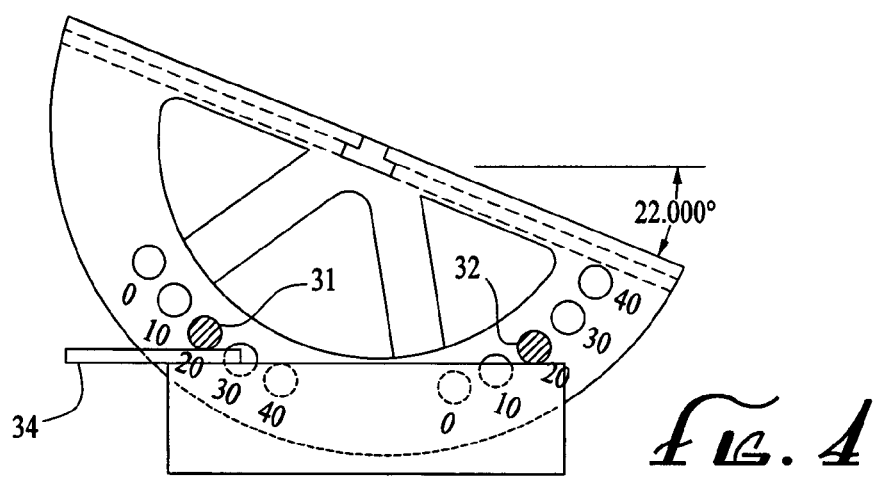
FIG. 4 is a front view analogous to FIG. 2, except that a gauge block has been inserted under one of the indexing pins.

Tilt table 10 is held in a precision vise 17, which has a pair of jaws 18 and 19. Each jaw has a flat upper surface 20, only one of which is shown in FIG. 4. Jaw 18, however, has a flat upper surface identical to flat upper surface 20.

Indexing pins 21 and 22 are shown inserted in a first and second set of holes 23 and 24, respectively. A bottom 14 is shown in the shape of a semi-cylinder so that it will not abut the base 25 of vise 17. This shape, of course, does not have to be part of a circle, but instead, could be in the shape of a polygon or otherwise chamfered to avoid contact.

The flat top 13 of tilt table 10 has means 26 for holding other clamping fixtures, such as clamping fixture 27. Clamping fixture 27 includes means for holding a work piece 28, which may be rotated by means provided by clamping fixture 27. Alternatively, the holes can be formed in the base of a holding device so that rather than affixing a clamping fixture 27 to the tilt table 10, the tilt table may be integral with the clamping device.

Figure 2:
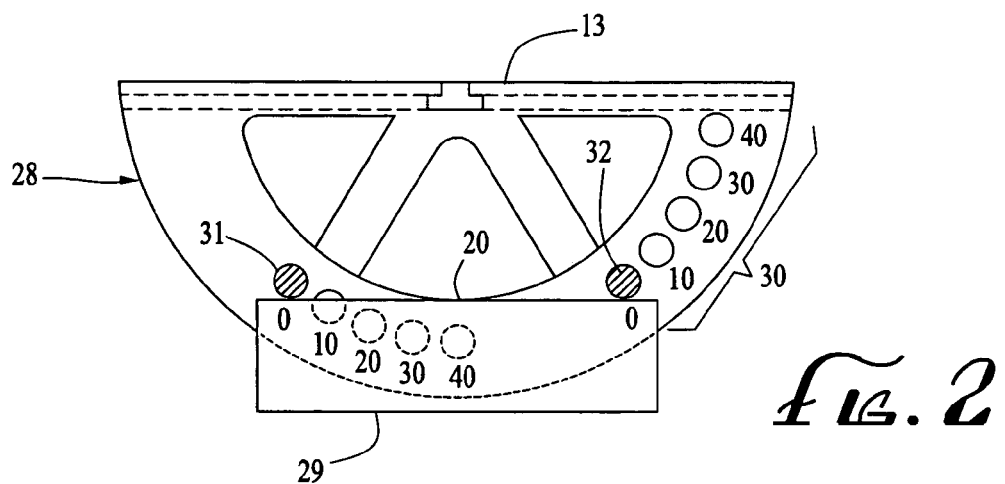
FIG. 2 is a front view of the tilt table of FIG. 1 held in a vise.
Figure 3:
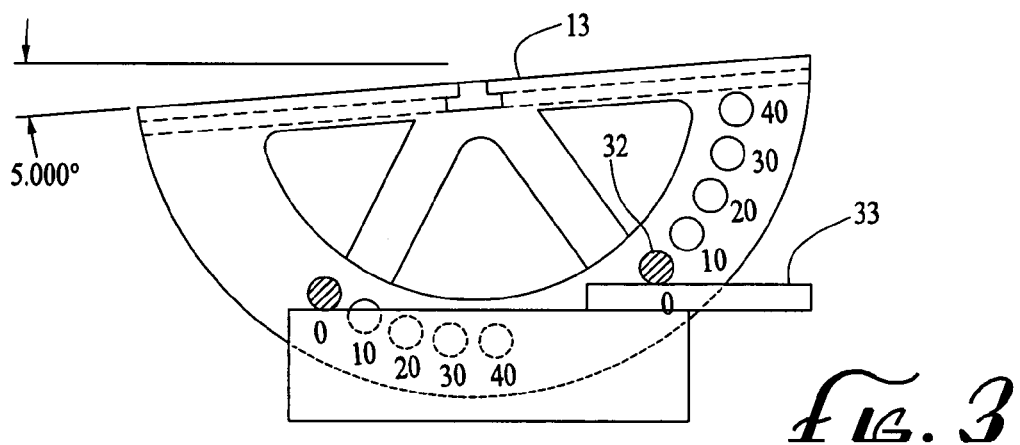
FIG. 3 is analogous to FIG. 2, except that a gauge block has been inserted under one of the indexing pins.

A tilt table provided in angles of 0, 10, 20, 30, and 40 is shown in FIG. 2 and indicated by reference character 28. Other sequences may be needed, such as 5, 10, 15, 20. A first set of holes 29 show degrees 0, 10, 20, 30, and 40. A second set of holes 30 show also angles 0, 10, 20, 30, and 40. A pair of indexing pins 31 and 32 are inserted in the holes indicated by indicia "0" in both the first and second set of holes 29 and 30. It is to be understood that identical pins, not shown, are inserted in identical holes formed in the back side of tilt table 28 and all four pins abut the flat upper surfaces 20 of the jaws of vise 17. The flat upper surface 13 is thus horizontal, or more accurately, parallel to surface 20.

In order to provide a –5° angle, a gauge block of appropriate thickness is placed under pin 32. This sets the angle of the flat upper surface 13 at –5 degree.

As shown in FIG. 4, indexing pins 31 and 32 have been placed in holes indicated by angle 20. A gauge block 34, providing a 2 degree angle change, has been placed under pin 31, thereby increasing the angle to 22 degrees, as indicated in FIG. 4. Thus, it is readily understood that gauge block 34, if placed under pin 32, would provide an angle of 18 degrees.

The positioning of the holes are such that the use of adjacent holds produce an integral number of degree changes in the flat top, such as 5, 10, 15, etc. Thus, the hole positions are set trigonomically to provide integral degree differences.

Figure 5:
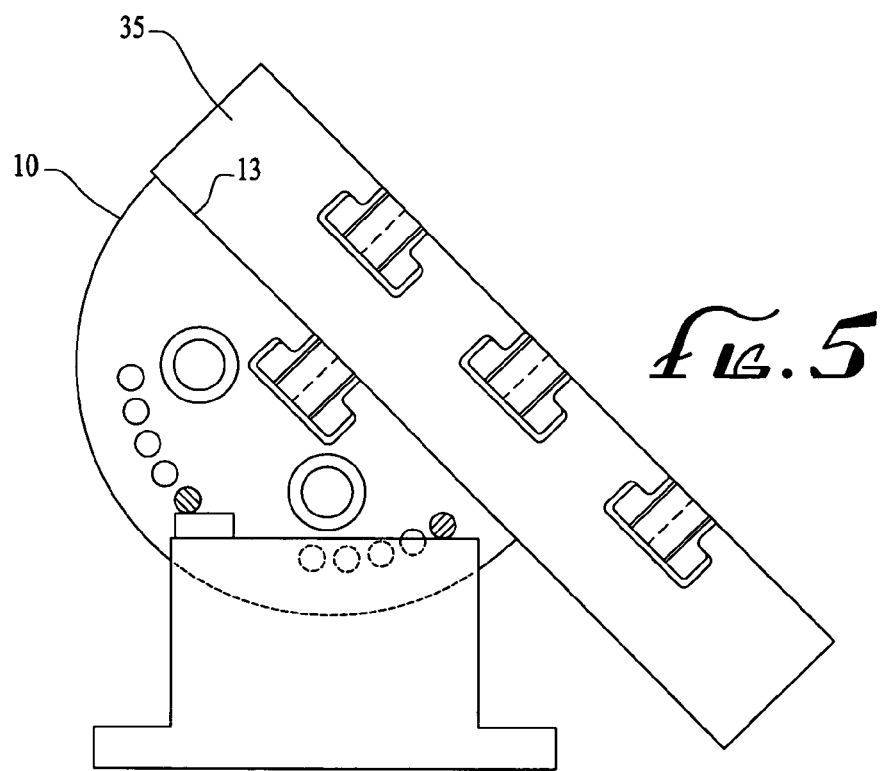
FIG. 5 shows a front view of the tilt table held in a vise and holding a sub-plate.

As shown in FIG. 5, various devices may be clamped on the upper surface 13 of tilt table 10. In FIG. 5, a sub-plate 35 is shown clamped against the upper surface 13 to provide for attachment of a desired additional clamping device.

In place of gauge blocks, various enlarged indexing pins can be used, as indicated in FIGS. 6 and 7. In FIG. 6, tilt table 36 has a conventional indexing pin 32 in the right series of holes and a square enlarged gauge block indicated by reference character 37 in a corresponding opening in the left side series of holes. Enlargement 37, as shown in FIG. 6, has four sides, one providing a 1 degree increase (or decrease) in angle, a second providing a 2 degree increase, a third providing a 3 degree increase, a fourth providing a 4 degree increase, and a fifth providing a 5 degree increase. Fractions or decimal parts of angles can be provided either by an enlargement or by use of a gauge block.

FIG. 7 shows a triangular enlargement indicated by reference character 38. This has sides providing 1 degree, 2 degree, and 3 degree changes in tilt. Another pin provides a 4 degree and 5 degree change.

FIG. 9 shows a circular enlargement pin 44.

It can be beneficial to provide a clamp, as shown in FIG. 8. Clamp 39 presses downwardly against indexing pin 31 and is held against the flat upper surface by bolt 40. Similarly, other clamping designs can be adapted to fit other shapes of indexing pins. For instance, clamp block 41 presses against enlarged indexing pin 42. It is also held against surface 20 by bolt 43.

The result is a tilt table which is quickly set up. Pins are selected for the angle required and installed onto the tilt table. The tilt table is then set onto the vise which is then clamped. This sequence cannot take more than five minutes and is the most important characteristic of the design of the present invention. The tilt table may be set with great accuracy providing plus or minus 60 seconds on angularity. The tilt table of the present invention is also very flexible because of its ability to use precalculated gauge blocks. Because the tilt table can receive different types of fixtures, such as indexers, clamp holder, vises, and rotary tables, it is highly versatile.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

We claim:

1. A quick set up tilt table for securement to a precision vise of a tool, said precision vise having a pair of jaws forming a flat upper surface, said quick set up tilt table comprising:

a plate of metal having a top, a bottom, a front side, a back side, a right side and a left side and having a thickness of at least ¼ inch between the front side and the back side and having the shape of one half of a cylinder or polygon on the bottom of as viewed from the front side thereof and a top configured to provide securement of a workpiece, said front and back sides being formed perfectly flat and parallel to each other and perpendicular to said flat top;

a series of a first and a second set of holes forming a precision machined arcuate hole pattern are formed in said front side and in said back side so that the holes in the front side match the holes in the back side; and a plurality of indexing pins are insertable in holes in said plate of metal so that a first set of indexing pins extends from one of said first set of holes in said front side and a corresponding opening in the back side, a second set indexing pins extends from one of said second set of holes in said front side and a corresponding opening in the back side, whereby when the tilt table is clamped between the jaws of the precision vise, the indexing pins rest on the flat upper surface of the vise and the top of the tilt table is set at a desired angle from the flat upper surface of the precision vise.

2. The quick set up tilt table of claim 1 wherein each of said holes is identified by adjacent indicia indicating a specific angle.

3. The quick set up tilt table of claim 2 wherein said plate of metal is clamped in said precision vise and has a cylindrical indexing pin extending from one of said holes in said first set of holes in both the front side and the back side and has a cylindrical indexing pin extending from one of said holes in said second set of holes having the same indicia as the indexing pins in said first set of holes in both the front side and the back side.

4. The quick set up tilt table of claim 3 further including a gauge block placed between the second set indexing pins in the second set of holes in both the front side and the back side and the flat upper surface of said precision vise.

5. The quick set up tilt table of claim 1 wherein said first set indexing pins have a shaped extension extending from said cylindrical first set indexing pins, said shaped extension being larger than said first set indexing pins.

6. The quick set up tilt table of claim 5 wherein said shaped extension is triangular and the three sides of said triangular extension increases the angle of tilt by one, two and three degrees.

7. The quick set up tilt table of claim of claim 5 wherein said shaped extension is square and the four sides of said square extension increases the angle of tilt by one degree.

8. The quick set up tilt table of claim 1 further including a clamp secured to at least one jaw of said precision vise and said clamp being tightenable against an indexing pin.

* * * * *